March 24, 1936.  I. J. SIMCOX ET AL  2,035,016

SMELTING OF ORES

Filed Sept. 18, 1933

INVENTORS
Ivor J. Simcox
BY Robert L. Peek
Hoguet & Neary
ATTORNEYS

Patented Mar. 24, 1936

2,035,016

UNITED STATES PATENT OFFICE 2,035,016

SMELTING OF ORES

Ivor J. Simcox and Robert L. Peek, Copper Cliff, Ontario, Canada, assignors to The International Nickel Company of Canada, Limited, a corporation of Canada Application September 18, 1933, Serial No. 689,810
In Canada August 15, 1933

16 Claims. (Cl. 75—62)

This invention relates to the smelting of ores, and is particularly directed to improvements in the smelting of ores in a reverberatory furnace where the non-ferrous metals of the ore are concentrated into a matte.

At the present time the usual practice of smelting in reverberatory furnaces for matte production consists in continuous charging of fine ore or concentrates, either raw or calcined, through openings placed along the sides of the furnace roof; supplying heat by burning oil or powdered coal at one end of the furnace; withdrawing furnace gases by means of chimney draft at the other end of the furnace; intermittent charging of converter slag at the burner end of the furnace; removal of slag at the flue end of the furnace and intermittent removal of matte through tap holes placed in the side or end walls of the furnace adjacent the offtake flue. It is usual to keep the feed openings at some little distance from the flue end of the furnace so as to afford a relatively undisturbed region wherein the settling of the matte from the slag may take place. The atmosphere in the furnace is held as nearly neutral as possible. Depending on the composition of the charge, there may be only a melting down of the materials charged, forming a slag and matte, or there may be reactions among the components of the charge resulting in a concentration of the non-ferrous metals into the matte.

The charge fed into the furnace along the side walls takes the form of a V, down the slopes of which molten material is continually flowing. Semi-fused and unmelted particles also slide down the sloping surfaces into the molten bath at the bottom of the V. Thus, small particles of oxides or silicates of the non-ferrous metals become dissolved in the slag and small particles of sulfides become dispersed in the slag, resulting in serious metal losses in the slag.

An examination of the rate of subsidence of metallic sulfide particles in molten slag has shown that the smaller particles settle so slowly that they will not pass through the slag into the underlying matte in any time within which it would be practicable to retain the slag within the furnace. Thus a particle having a diameter of 1/1000th of an inch may, with slags of ordinary viscosity, require over three days to settle through a foot of slag.

It is well known that most slags contain considerable quantities of magnetite. The magnetite at ordinary slag temperatures occurs as a separate solid phase dispersed in the slag, and when present in considerable quantity may hinder the subsidence through the slag of globules of sulfides of the metals. Such magnetite may form a layer on the surface of the matte pool below the slag and thus hinder or prevent subsiding particles of sulfide from making contact and coalescing with the underlying matte.

Further, the magnetite tends to form a mush on the bottom of the furnace beneath the matte and thus interfere seriously with the continuous operation of the furnace.

An object of this invention is to minimize the losses of the desired metals in the slag of the reverberatory matting furnace. A further object is to prevent the formation of magnetite accretions on the furnace bottom.

We have found that by creating a zone of extreme turbulence in the stream of molten slag and matte passing through the furnace the metal losses in the slag may be greatly reduced and that magnetite does not settle on the furnace bottom.

For optimum results, this zone of turbulence should be created at the end of the feeding area, which, according to the usual practice, is about two-thirds of the furnace length from the burner end.

The preferred method for creating the turbulent zone is to introduce jets of steam into the molten mass of matte and slag. These jets are advantageously so directed into and through the bath as to cause portions of the normally underlying body of matte to be carried upwardly into and intermingled with the overlying layer of slag. The steam jets should be sufficient in volume and pressure to bring the matte into repeated contact with all parts of the slag.

This thorough and repeated contact of slag with matte results in a substantial coalescence of the minute sulfide particles dispersed in the slag into the matte. It also results in the conversion of oxides and silicates which may be in the slag to sulfides by reacting with the ferrous sulfide of the matte. When such oxides are brought into intimate contact with the matte by the beforementioned turbulence, they may react with the ferrous sulfide of the matte, thus:

or

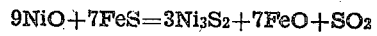

In each case the newly formed sulfide becomes incorporated in the matte pool and the FeO is absorbed in the slag.

Further, the magnetite suspended in the slag or lying at the interface between the slag and matte or underlying the matte on the furnace bottom is forced into such intimate contact with the matte that the reaction $$3Fe_3O_4 + FeS = 10FeO + SO_2$$

will take place to a considerable extent. The ferrous oxide will be absorbed in the slag and the small amount of magnetite not reacted with by the ferrous sulfide of the matte will be dispersed in the slag and matte and thus removed from the interface of slag and matte. Owing to the conversion of a large part of the magnetite to ferrous oxide, the tendency of the magnetite to build up on the furnace bottom is greatly reduced. Moreover, the agitation, when suitably controlled as to direction and point of introduction of the agitating medium, and as to the rate of introduction of such medium, has the effect of clearing the bottom of the furnace of any magnetite mush that would otherwise tend to collect there and to cause the mush to be carried out of the furnace in the slag and matte.

It has previously been proposed to reduce metal losses in slags by introduction of substances into the slag which would reduce the oxides which were assumed to exist in the slag. The use of metallic iron, barren or low grade sulfide minerals, carbon in various forms has been suggested for this purpose.

Our process does not involve the introduction of any reducing agents into the molten bath of slag and matte.

An example of the actual practice of our invention may be described as follows: A coal-dust fired reverberatory furnace of the usual size was charged with copper-nickel concentrate and converter slag and there were produced about 275 tons of copper-nickel matte and 400 tons slag per 24 hours. Steam under 40 to 50 pounds pressure per square inch was introduced through two 1″ iron pipes into the molten bath at a point at the end of the feeding zone, which in this case was about two-thirds of the length of the furnace from the burner end. About 50 tons of steam were introduced into the bath per 24 hours. The steam pipes were passed through the sides of the furnace in opposing relation to each other and at an angle of about 30° to the horizontal. The ends of the pipes were immersed in the flowing stream of molten slag and matte to a point near the hearth of the furnace. In the course of this operation, the pipes, unless protected, will burn off at least to the interface of the matte and slag, but this does not seriously affect the operation. The steam passing through the bath under these conditions sets up a zone of violent turbulence. The stream of molten slag and matte passes through this turbulent zone into the undisturbed space at the flue end of the furnace where the separation of the slag and matte is completed.

The operation of the furnace with continuous agitation of the bath as above described resulted in a decrease in the copper-nickel losses in the slag of about 50%.

The procedure outlined above may be carried out in the reverberatory furnace shown diagrammatically in the accompanying drawing, in which—

Figure 1:
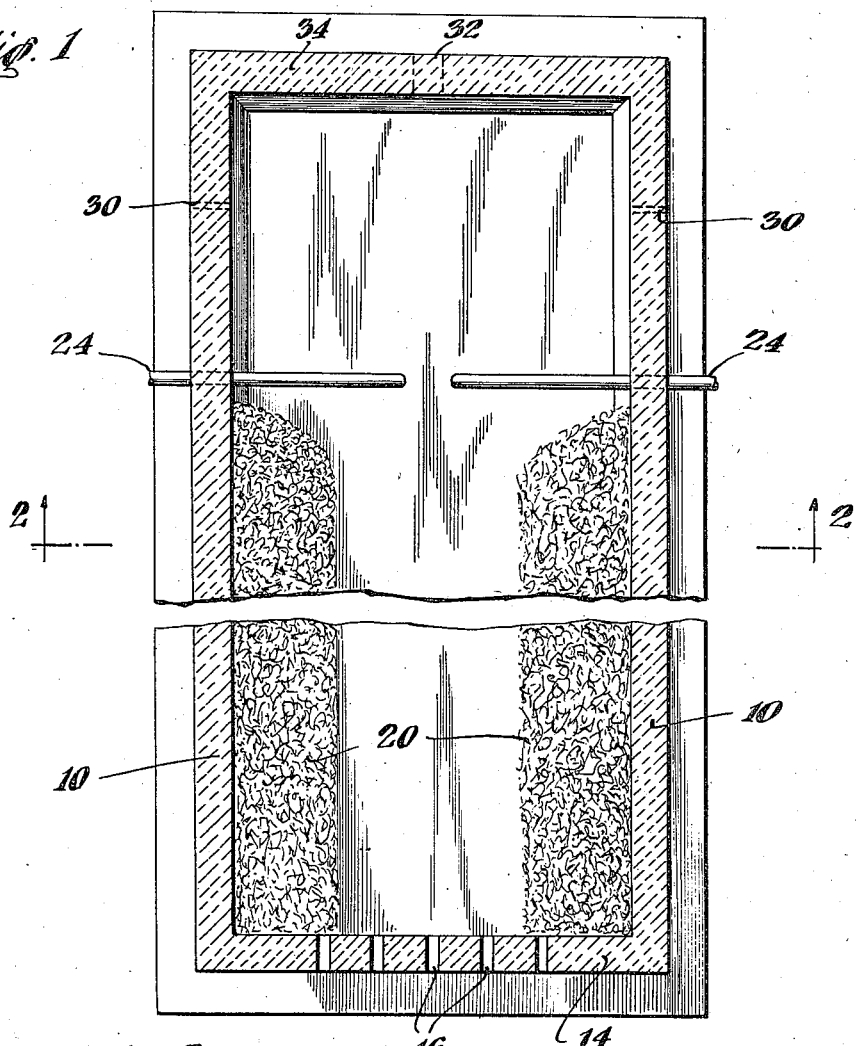
Fig. 1 is a horizontal section taken on line 1—1 of Fig. 2.
Figure 2:
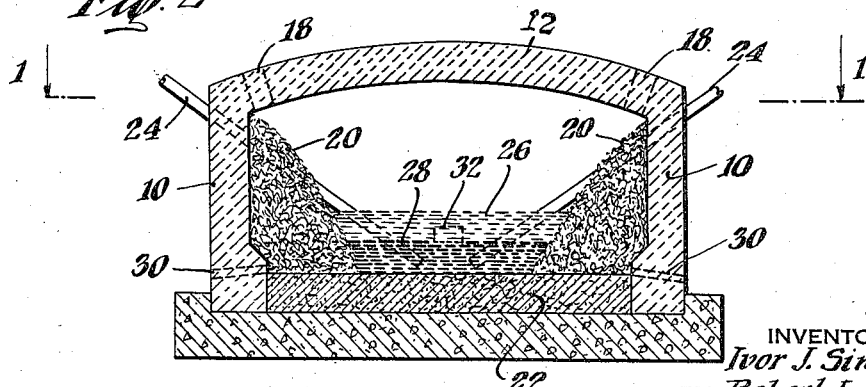
Fig. 2 is a vertical section taken on line 2—2 of Fig. 1.

The reverberatory furnace is of the usual form, consisting of side walls 10, end walls 14 and 34, roof 12, and hearth 22, constructed of refractory material. One end wall 14 is provided with holes 16 for the introduction of burners. The off-take flue is situated at the other end of the furnace and is not shown in the drawing.

The roof 12 is provided with a series of openings 18 through which the material to be smelted is charged forming the banks 20. The steam pipes 24 are shown passing through the side walls and penetrating the molten bath of slag 26 and matte 28. The tap holes 30 for matte are shown in the side walls 10 and a tap hole 32 for slag is shown in the end wall 34.

It will be seen that the stream of molten slag and matte passing along the channel between the ore banks 20 must pass through the zone of turbulence created by the steam entering the bath through the pipes 24 before it can reach the zone of quiescence situated between the pipes 24 and the end wall 34 of the furnace.

Other means may be used to secure the desired zone of turbulence. Flue gases or other gases of low oxygen content may be injected into the bath under pressure or mechanical contrivances such as paddle-wheels or mechanical stirrers may be used. It is only necessary to produce in the bath sufficiently violent agitation ultimately to bring all particles of metallic sulfides entrained in the slag into contact with the matte with which the particles will coalesce.

The invention has been described with particular reference to its application in the treatment of copper-nickel concentrates. It will be understood that it is similarly applicable in the treatment of ores and concentrates of other metals capable of forming mattes when subjected to reverberatory smelting conditions. The treatment of copper-nickel ores, as distinguished from concentrates, and the treatment of ores and concentrates of one or the other of these metals are also within the scope of the invention. Where we have used the term "ore" in the claims it is to be interpreted in its broad or general sense as including not only raw ores but also ores that have been subjected to various beneficiating treatments, e. g., concentrates.

While the invention is particularly applicable in connection with the continuous smelting of ores in a reverberatory furnace, it is not limited thereto. The bath of matte and slag may, if desired, be drawn from the furnace where it was produced, into a suitable container and there subjected to violent agitation. Thereafter, the bath may be passed into another container where the matte and slag are permitted to separate by gravity. Again, the principle of the invention may be applied in recovering non-ferrous metals from slags produced in various other ways. In practicing the invention upon slags the slag will be disposed upon a body of matte in a suitable vessel and subjected to agitating conditions in a similar manner as above described.

We claim:

1. In the smelting of matte-forming ores, the process which comprises subjecting a charge of such an ore to a smelting temperature in a reverberatory furnace to produce a matte and a covering layer of slag, leading the body of matte and the overlying layer of slag to an agitation zone and there subjecting the matte and slag to violent agitation induced by injecting a substantially inert gaseous medium into the underlying body of matte so as to cause portions thereof to be carried upwardly into the overlying layer of slag, and finally leading the matte and slag to a settling zone and there permitting the slag and matte to separate by gravity.

2. In the smelting of matte-forming ores, the process which comprises subjecting a charge of such a copper-containing ore to a smelting temperature in a reverberatory furnace to produce a matte and a covering layer of slag, leading the body of matte and the overlying layer of slag to an agitation zone and there subjecting the matte and slag to violent agitation induced by injecting steam into the underlying body of matte so as to cause portions thereof to be carried upwardly into the overlying layer of slag, and finally leading the matte and slag to a settling zone and there permitting the slag and matte to separate by gravity.

3. In the smelting of copper-nickel concentrates, the process which comprises subjecting a charge of copper-nickel concentrate and a converter slag to a smelting temperature in a reverberatory furnace to produce a matte and a covering layer of slag, leading the body of matte and the overlying layer of slag to an agitation zone and there subjecting the matte and slag to violent agitation induced by injecting a substantially inert gaseous medium into the underlying body of matte so as to cause portions thereof to be carried upwardly into the overlying layer of slag, and finally leading the matte and slag to a settling zone and there permitting the slag and matte to separate by gravity.

4. In the smelting of copper-nickel concentrates, the process which comprises subjecting a charge of copper-nickel concentrate and a converter slag to a smelting temperature in a reverberatory furnace to produce a matte and a covering layer of slag, leading the body of matte and the overlying layer of slag to an agitation zone and there subjecting the matte and slag to violent agitation induced by injecting steam into the underlying body of matte so as to cause portions thereof to be carried upwardly into the overlying layer of slag, and finally leading the matte and slag to a settling zone and there permitting the slag and matte to separate by gravity.

5. The method of recovering non-ferrous metals from slags which comprises disposing the slag to be treated upon a body of matte, subjecting the matte and slag to violent agitation induced by injecting a substantially inert gaseous medium into the underlying body of matte so as to cause portions thereof to be carried upwardly into the overlying layer of slag, and finally causing said matte and slag to separate by gravity in a zone of quiescence.

6. The method of recovering non-ferrous metals from slags which comprises disposing the slag to be treated upon a body of matte, subjecting the matte and slag to violent agitation induced by injecting steam into the underlying body of matte so as to cause portions thereof to be carried upwardly into the overlying layer of slag, and finally causing said matte and slag to separate by gravity in a zone of quiescence.

7. The method of recovering non-ferrous metals from slags which comprises disposing the slag to be treated upon a body of matte and creating a zone of turbulence at and adjacent the interface of said slag and matte thereby causing portions of the underlying body of matte to be carried up into the overlying slag and preventing the accumulation of magnetite at the interface, said turbulence being unaccompanied by the introduction of a reducing agent.

8. In the smelting of non-ferrous metals in a reverberatory furnace the process which comprises smelting an ore charge in a reverberatory furnace to form a matte, covering said matte with a slag produced in a converter operation, and then creating a zone of turbulence at and adjacent the interface of said slag and said matte, thereby causing portions of the underlying body of matte to be carried up into the overlying slag and preventing the accumulation of magnetite at the interface, said turbulence being unaccompanied by the introduction of a reducing agent.

9. In the smelting of copper-nickel concentrates in a reverberatory furnace, the process which comprises subjecting the charge to heat at a smelting temperature in one zone of the furnace to produce a matte and a covering layer of slag, flowing the matte and covering layer of slag in a direction away from said zone toward a settling zone, then at a point in the flow of said matte and slag intermediate said zones violently agitating the matte and the slag to produce intermingling of the matte and slag and thereby cause fine matte particles carried in said slag to coalesce into larger particles so that their separation by gravity is made possible, said agitation being unaccompanied by the introduction of a reducing agent, and finally leading the slag and matte to the settling zone and there permitting the coalesced matte particles to settle and collect in the underlying bath of matte.

10. The method of recovering non-ferrous metals from slags which comprises disposing the slag to be treated upon a body of matte and producing intimate and repeated contacts of said slag and matte by injecting an inert gaseous medium downwardly and inwardly from the sides of the bath thus formed at a point adjacent the interface of said body of matte and the said interposed layer of slag.

11. In the smelting of copper-containing ores, the process which comprises subjecting a charge of copper-containing ore to a smelting temperature in a reverberatory furnace to produce a matte and a covering layer of slag, then subjecting the matte and slag to violent agitation induced by injecting a substantially inert gaseous medium into the underlying body of matte so as to cause portions thereof to be carried upwardly into the overlying layer of slag, and finally leading the matte and slag to a settling zone and there permitting the slag and matte to separate by gravity.

12. In the smelting of copper-containing ores, the process which comprises subjecting a charge of copper-containing ore to a smelting temperature in a reverberatory furnace to produce a matte and a covering layer of slag, then subjecting the matte and slag to violent agitation induced by injecting a substantially inert gaseous medium into the underlying body of matte so as to cause portions thereof to be carried upwardly into the overlying layer of slag, and causing the slag and matte to separate by gravity in a settling zone.

13. In the smelting of copper-containing ores, the process which comprises subjecting a charge of copper-containing ore to a smelting temperature in a reverberatory furnace to produce a matte and a covering layer of slag, then subjecting the matte and slag to violent agitation induced by injecting a substantially inert gaseous medium under pressure downwardly and inwardly into the bath at a point adjacent the interface of said slag and matte, and so regulating the amount and rate of introduction of said medium that the zone of violent agitation shall comprise a zone substantially co-extensive with that portion of the cross section of the bath normally occupied by the matte and including the normal interface of the matte and slag whereby the matte and slag particles are thoroughly and repeatedly intermingled, and the building up of a body of magnetite in the bottom of the bath is substantially prevented, and finally causing the slag and matte to separate by gravity in a settling zone.

14. In the smelting of matte-forming ores, the process which comprises subjecting a charge of such an ore to a smelting temperature in a reverberatory furnace to produce a matte and a covering layer of slag, then subjecting the matte and slag to violent agitation induced by injecting a substantially inert gaseous medium into the underlying body of matte so as to cause portions thereof to be carried upwardly into the overlying layer of slag, and causing the slag and matte to separate by gravity in a settling zone.

15. In the smelting of matte-forming ores, the process which comprises subjecting a charge of such an ore to a smelting temperature in a reverberatory furnace to produce a matte and a covering layer of slag, then subjecting the matte and slag to violent agitation induced by injecting steam into the underlying body of matte so as to cause portions thereof to be carried upwardly into the overlying layer of slag, and causing the slag and matte to separate by gravity in a settling zone.

16. In the smelting of nickel-containing ores, the process which comprises subjecting a charge of nickel-containing ore to a smelting temperature in a reverberatory furnace to produce a matte and a covering layer of slag, then subjecting the matte and slag to violent agitation induced by injecting a substantially inert gaseous medium into the underlying body of matte so as to cause portions thereof to be carried upwardly into the overlying layer of slag, and causing the slag and matte to separate by gravity in a settling zone.

IVOR J. SIMCOX.
ROBERT L. PEEK.